United States Patent [19]

Wu et al.

[11] 4,429,113
[45] Jan. 31, 1984

[54] FRACTIONATION OF POLYMERS

[75] Inventors: Stephen H. Wu; Clarence C. Dannelly, both of Kingsport, Tenn.

[73] Assignee: Eastman Kodak Company, Rochester, N.Y.

[21] Appl. No.: 229,032

[22] Filed: Jan. 26, 1981

Related U.S. Application Data

[63] Continuation of Ser. No. 45,580, Jun. 4, 1979, abandoned.

[51] Int. Cl.$^3$ .............................. C08F 6/00; C08F 6/04
[52] U.S. Cl. ..................................... 528/486; 528/487; 528/491; 528/492; 528/494; 528/495
[58] Field of Search ............... 528/491, 492, 494, 495, 528/486, 487

[56] References Cited

U.S. PATENT DOCUMENTS 3,679,638 7/1972 Korsgen ............................. 528/486
3,701,764 10/1972 Hargitay ............................. 528/486
3,790,538 2/1974 Schön ................................. 526/208
3,843,585 10/1974 Kangas .............................. 526/292.2

Primary Examiner—C. A. Henderson
Attorney, Agent, or Firm—John F. Stevens; Daniel B. Reece, III

[57] ABSTRACT

Process of obtaining a high molecular weight fraction from a polar polymer which comprises the steps of first, forming a solution of the polar polymer in a solvent which is also a solvent for a selected coacervating substance, then mixing with the solution a coacervating substance having at least two proton donating or proton receiving groups which are opposite the polarity of the polar polymer in an amount sufficient to crosslink molecules of said polar polymer of a molecular weight above a selected range at the solution temperature, thereby forming coacervated high molecular weight polymer solids, and then separating the high molecular weight solids from the solution. The coacervated polymer may then be dissolved and the coacervating substance removed by precipitation.

3 Claims, No Drawings

FRACTIONATION OF POLYMERS

This is a continuation of application Ser. No. 45,580 filed June 4, 1979, now abandoned.

BACKGROUND OF THE INVENTION

1. Field of the Invention

This invention relates to processes for purifying polymers, and more particularly, this invention relates to processes for separating high molecular weight fractions from polymers containing a range of molecular weights.

2. Description of the Prior Art

As polymer technology is extended into more product areas, there is an increasing need for purification of polymeric substances. The nature of the impurities found in polymers depends on the origin of the polymers. In the case of synthetic polymers, the impurities are usually associated with the method of synthesis. In the case of natural polymers, the impurities are associated with the natural source of the polymer and the method of extraction or separation from that source.

In addition to simple removal of nonpolymeric impurities, it is frequently important to separate polymeric substances from relatively low or relatively high molecular weight species of the same polymeric substance. The reasons for this need to separate specific narrow molecular weight fractions having improved physical and chemical properties from a mixture are well known in the art but will become further apparent later in this disclosure.

There are many processes reported which are either expensive to operate or suitable only for laboratory preparation of pure, specific molecular weight fractions of polymeric substances. The most important of these processes include precipitation from solution by addition of a nonsolvent liquid, chromatographic separation, sedimentation techniques, diffusion techniques, and ultrafiltration using porous membranes.

U.S. Pat. No. 2,945,016 relates to a process for separation of polymers comprising adding an open chain hydrocarbon to a solution of normally solid polymer in a cyclic hydrocarbon solvent, thereby causing the formation of a polymer-rich phase and a solvent-rich phase, and recovering at least one of said phases.

SUMMARY OF THE INVENTION

The present invention provides a process for obtaining a high molecular weight fraction from a polymer which comprises forming a solution of the polar polymer in a solvent which is also a solvent for a selected coacervating substance, mixing with the solution a coacervating substance having at least two proton donating or proton receiving groups which are opposite the polarity of said polar polymer in an amount sufficient to cross link molecules of said polar polymer of a molecular weight above a selected range at the solvent temperature, thereby forming coacervated high molecular weight polymer solids, and separating the high molecular weight solids from the solution. The separated high molecular weight solids may then be washed and separated from the coacervating substance. Use of this process provides a simple, precise, and convenient way of extracting high molecular weight fractions from the polymer.

DETAILED DESCRIPTION OF THE INVENTION

According to the present invention, polar polymers are fractionated according to molecular weight, so that the polymer fraction within a selected molecular weight range may be isolated. The process comprises forming a solution of the polar polymer in a solvent which is also a solvent for a selected coacervating substance, and then coacervating the higher molecular weight polymer fraction by adding a selected coacervating substance to form a complex. The precipitated or coacervated polymer complexes may then be washed and regenerated.

Polar polymers which may be used in the process of the invention include natural and synthetic polyelectrolytes, polymeric acids and polymeric bases. For example, polar polymers include those polymers containing carbonyl, sulfate, sulfonate, phosphate, and phosphite groups, and salts of the groups. Also, polar polymers include those polymers containing unreacted acidic phenolic groups, polymers containing salts of phenolic groups, polymers containing weak acidic groups or salts of these groups such as, for example, the enolic form of diketones and the pendant inorganic radicals such as arsenic.

Basic polar polymers include polymers containing unreacted organic basic radicals or salts of the radicals such as primary, secondary, and tertiary aliphatic amine groups, i.e.,

wherein $R_1$ and $R_2$ can be H, alkyl or aryl having from 1 to 20 carbon atoms, and cyclic amine groups, i.e.,

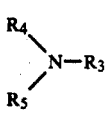

wherein $R_3$ can be H or alkyl having from 1 to 20 carbon atoms, and $R_4$ and $R_5$ are members of an alicyclic ring structure.

Polar polymers also include those polymers derived from vinyl substituted heterocyclic ring structures containing at least 4% nitrogen based on the total weight of the heterocyclic radical and wherein the total weight of such groups in the polymer are from 1 to 37 weight percent. Some preferred examples of such structures are:

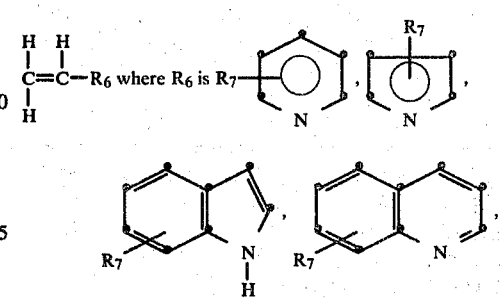

-continued

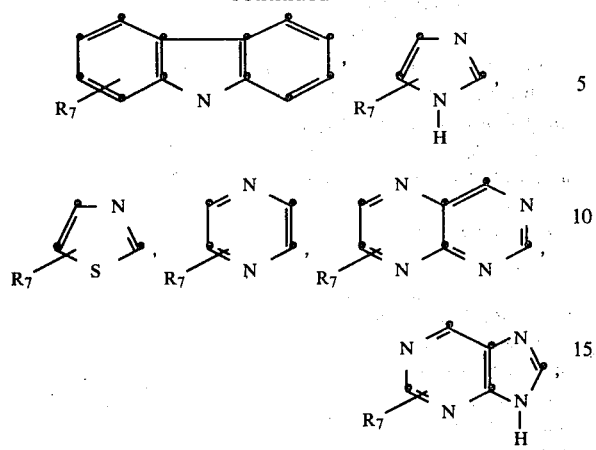

wherein R$_7$ is any organic radical or radicals having a total molecular weight of less than 300.

Such compositions as homopolymers and copolymers containing the monomeric constituents vinylpyridine, derivatives of vinylpyridine, N,N-dialkyl ether esters and amides of acrylic and methacrylic acids, vinylcarbazole, allyl amine, diallylamine, ethylenimine, and derivatives of ethylenimine are included. Also included are either synthetic or natural polymers which are rendered basic by chemical reaction such as cellulose propionate morpholinobutyrate, reduction product of polyacrylonitriles, polystyrene and derivatives of polystyrene. Also included are the acid salts and quaternary ammonium derivatives of basic amine containing polymers and quaternary derivatives of sulfide groups containing polymers.

Such compositions as homopolymers and copolymers containing the monomeric constituents acrylic acid, methacrylic acid, maleic acid, fumaric acid, itaconic acid, and ethylenically unsaturated monomers containing sulfate, phosphate, sulfonate, phosphonate, and phosphite groups are included. Also included are natural and synthetic polymers which contain unreacted acidic functionality obtained from chemical reaction starting with a neutral polymer.

Polymers containing both acidic and basic functionality can be fractionated by the process of the invention. For instance, polymers containing both amino groups and carboxylic acid groups such as the copolymer of N,N-diethylaminoethyl acrylate and acrylic acid may be separated from monomeric impurities and/or high or low molecular weight fractions. The invention is of particular value in the purification of natural proteins where coacervation and separation is performed at or near the isoelectric pH.

In the broadest sense, solvents or mixtures of solvents used in this invention are capable of dissolving the polar polymers and selected coacervating substances, but allow precipitation or insolubilization of high molecular weight portions of polar polymers with coacervating substances in the solvent media.

Many solvents are useful in this invention. Useful solvent types include water, alcohols, e.g.; methanol, ethanol, isopropanol, n-propanol, n-butanol, isobutanol, octanol, and ethylene glycol; acetones, e.g.; acetone, methyl ethyl ketone, diethyl ketone, and methyl isobutyl ketone; esters, e.g.; ethyl acetate, isopropyl acetate, butyl acetate; organic acids, e.g.; acetic acid, formic acid, propionic acid, and isobutyric acid; ethers, e.g.; methyl ethyl ether, diethyl ether, 1,4-dioxane; mineral acids and bases, e.g.; dilute aqueous hydrochloric acid, dilute aqueous sulfuric acid, dilute phosphoric acid, and dilute alkali solutions; and aromatic solvents, e.g.; benzene, xylene.

Some other useful solvents include nitromethane, dimethyl formamide, tetrahydrofuran, pyridine, chloroform, trichloroethylene, methylene chloride, ethylenedichloride, and buffered aqueous systems.

Mixtures of two or more solvents may be used. Mixtures of solvents and nonsolvents for a particular polymer may also be used. The purpose of using mixtures of solvents or mixtures of solvents and nonsolvents for a particular polymer is to adjust the polarity of the solvent systems. The desired polarity of the solvent is dependent on the particular polymer being purified. The polymer-solvent relationship is usually adjusted so that, although the polymer is fully dissolved, only small changes are required to precipitate the polymer. The precise adjustment required will be obvious to one skilled in the art of dissolving polymers.

Nonsolvents include n-pentane, n-hexane, n-heptane, cyclohexane, toluene, hydrogenated naphthalenes, water, carbon tetrachloride, diethyl ether, petroleum ether and ethyl acetate.

The term coacervating substance is used herein to mean acids or bases which have at least two acidic or two basic groups opposite to the polarity of the polymer, and are capable of reacting with the dissolved polymer and wherein the reaction product is at least partially precipitated from solution in the selected solvent.

The polyfunctional acids or bases used in this invention have the general formula:

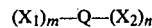

where $X_1$ and $X_2$ represent proton-donating or proton-receiving groups, Q is the inorganic or organic moiety of the molecule, m and n are the multiplicity of the particular acid or base group. The total multiplicity, n+m, must be equal to or greater than two.

A wide variety of organic acids or bases may be employed in this invention. Organic acids in which there are at least two acid groups such as carboxylic, sulfur and phosphorus containing acid moieties may be employed in this invention. Organic bases in which there are at least two basic groups such as primary, secondary, tertiary, quaternary amines, heterocyclic amines, aromatic amines, may also be employed in this invention.

Examples of organic acids useful as coacervating substances include oxalic acid, malonic acid, succinic acid, adipic acid, sebacic acid, dimer acid, tartaric acid, phthalic acid, terephthalic acid, trimesic acid, trimellitic acid, 1,2,4,5-benzenetetracarboxylic acid, polysulfonic acids, and pyrophosphates.

Examples of organic bases useful as coacervating substances include ethylenediamine, unsymmetrical dimethylethylenediamine, N,N,N',N'-tetraethylenediamine, trimethylenediamine, hexamethylenediamine, phenylenediamine, imidazole, pyrimidine, purine, nicotine and 2,2'-bipyridine.

Examples of amphoteric organic compounds useful as coacervating substances include amino acids, polyamino acids, proteins and ethylenediaminetetracetic acid.

Also included as coacervating substances are polymers containing acidic and basic groups. Some typical coacervating agents of this type are polymers and copolymers containing acrylic acid, methacrylic acid, maleic acid, fumaric acid, itaconic acid, vinyl substituted pyridines, vinyl quinolines, dialkyl substituted aminoethyl esters, and amides of acrylic and methacrylic acid, vinyl carbazole, and modified natural polymers such as cellulose propionate morpholinobutyrate and carboxy cellulose.

The process of this invention comprises first dissolving the selected polar polymer in the solvent. Solubility characteristics are well known in the art and are described in technical literature, for example, in "Textbook of Quantitative Inorganic Analysis" by Kolthoff and Sandell (The Macmillan Company, New York, 1948). Temperatures at or near room temperature are often preferred. The polymer and solvent are preferably agitated to speed up the dissolving process. Next, a selected quantity of coacervating substance, which is also soluble in the selected solvent, is added to the solution to coacervate the higher molecular weight fraction of the dissolved polymer. The quantity of coacervating substance used to coacervate the selected fraction is determined by routine experimentation. The final amount used depends on the objective, i.e., the smaller the quantity of coacervating substance used, the smaller the range of higher molecular weight polymer solidified. The polymer-solvent ratio is preferably adjusted so that, although the polymer is fully dissolved, only small changes are required to coacervate the polymer. The higher molecular weight fraction solidifies prior to lower molecular weight fractions as the coacervating substance is added.

The higher molecular weight fraction of polymer and coacervating substance is separated from the solution by conventional techniques such as filtering or centrifuging. Following separation, the fraction is then purified by washing and separation of the polymer from the coacervating substance. The polymer is separated from the coacervating substance by dissolving the coacervated polymer in a suitable solvent and precipitating the coacervating substance. Suitable solvents and precipitating agents for the particular materials are well known by those skilled in the art. The precipitated coacervating substance is then removed, such as by filtering or centrifuging, to leave the polymer remaining in solution.

The following examples are submitted for a better understanding of the invention.

EXAMPLE 1

Ten grams of poly(2-methyl-5-vinylpyridine/styrene) are dissolved in 200 ml acetone and 0.3 g succinic acid in acetone as coacervating substance is added. The solution is vigorously agitated. The supernate which contains low molecular weight species is removed by the centrifugation method. The test is repeated using 0.4 and 0.6 g succinic acid. The number average molecular weights of the polymers in the supernates obtained by boiling point elevation method are shown as follows:

|  | Succinic Acid Added | No. Average Molecular Wt. |
| --- | --- | --- |
| Supernate 1 | 0.3 g | 2258 |
| Supernate 2 | 0.4 g | 859 |
| Supernate 3 | 0.6 g | 839 |

These results clearly indicate that separation of low molecular weight polymers is achieved by adjusting the amount of coacervating substance added to the polymer solutions.

EXAMPLE 2

Ten grams poly(2-methyl-5-vinylpyridine/styrene) are dissolved in 200 ml acetone. Three-tenths gram succinic acid in acetone is added to the polymer solution with vigorous agitation at $\sim 40°$ C. After the cloudy mixture is cooled, the supernate and polymer coacervates are separated by centrifugation.

The coacervate is then washed with 200 ml acetone three times with agitation, heating, cooling, and centrifugation steps as described in Example 1 above. The purified coacervate is removed and dissolved in 200 ml 95/5 acetone/water. One gram $Ca(OH)_2$ is then added to precipitate the succinic acid in the solution. After the solution is cooled, the polymer solution is separated from the precipitate by centrifugation.

It is found that the supernate has lower molecular weight than the parent polymer, and the purified polymer has higher molecular weight than the original polymer. The low molecular weight species (M.W. $\leq 1000$) in the purified polymer is determined to be less than 10 ppm by ultramembrane filtration followed by UV analysis of the vinyl pyridine moiety. The original polymer contains 1600 ppm low molecular weight species by the same analytical measurement.

EXAMPLE 3

Ten grams polymer purified by the process described in Example 2 is dissolved in 200 ml acetone. Three-tenths gram succinic acid is added to precipitate the polymer. After removing the supernate, the polymer coacervate is then dispersed in boiling acetone solution which contains 1% water. The solution is cooled to $\sim 5°$ C. to allow the precipitation of the polymer succinic acid complex. The polymer-succinic acid complex is then washed two more times with acetone which contains 1% water. Other steps to regenerate purified polymer are the same as described in Example 2. The final purified sample exhibits higher molecular weight and a narrower molecular weight distribution than Example 2.

EXAMPLE 4

Ten grams of 80/20 methylmethacrylic acid/methyl methacrylate polymer are dissolved in acetone. Ethylenediamine, 0.4 g, in methanol is added to the polymer solution. The precipitate is separated from the supernate by centrifugation. The precipitate is then washed with acetone/methanol solution 4 times as in the processes described in Example 2 and 3. Finally the precipitate is dissolved in methanol. A small amount of dilute HCl is added to precipitate the diamine. The polymer purified has a higher molecular weight and a narrower molecular weight distribution than the starting material. The first supernate solution after removing the precipitate is condensed and analyzed for molecular weight distribution. It contains a major portion of the low molecular weight species from the original polymer solution.

EXAMPLE 5

Ten grams of 2-methyl-5-vinylpyridine/methylmethacrylic acid polymer is dissolved in acetone. 0.2 g low molecular weight polyacrylic acid (I.V.=0.01) in acetone is added to the polymer solution. The supernate is analyzed for molecular weight distribution. It exhibits much lower molecular weight distribution and contains about 90% of the low molecular weight species. The precipitate is further washed three times with acetone/methanol solution. The purified polymer complex is then dispersed in ethanol/water. Calcium hydroxide is added to precipitate polyacrylic acid. The purified polymer exhibits higher average molecular weight than the original polymer. The low molecular weight species in the purified polymer is lower than the detection limit by U.V. analysis of the pyridine moiety.

EXAMPLE 6

Poly(4-vinylpyridine) is fractionated by coacervation techniques using a methanol and water solvent system and trimesic acid as a coacervating substance. The polymer may be dissolved in the methanol/water system at ratios of 100/0 to 42/58. The polymer may be precipitated at methanol/water ratios of from 42/58 to 0/100. The non-overlapping of solubility of the polymer and trimesic acid allows the proper selection of methanol/water ratios which may enhance the precipitation of the trimesic acid. The separation of polymer from trimesic acid can then be achieved. For example, 2.5 g poly(4-vinylpyridine) is dissolved in 10 ml of methanol. Water is added until the cloud point is reached. The volume of water to reach this point is 13.6 ml. Thus, the minimum methanol/water ratio for the polymer to stay in solution is 42/58.

Unless otherwise specified, all parts, percentages, ratios, etc., are on a weight basis.

The invention has been described in detail with particular reference to preferred embodiments thereof, but it will be understood that variations and modifications can be effected within the spirit and scope of the invention.

We claim:

1. The process of obtaining a high molecular weight fraction from a polymer which comprises the steps of
   (a) forming a solution of the polar polymer in a solvent which is also a solvent for a selected coacervating substance,
   (b) mixing with said solution a coacervating polymer having at least two proton donating or proton receiving groups which are opposite the polarity of said polar polymer in an amount sufficient to crosslink molecules of said polar polymer of a molecular weight above a selected range at the solution temperature, said coacervating substance being a polyfunctional acid or base having the formula $$(X_1)_m-Q-(X_2)_n$$

wherein $X_1$ and $X_2$ represent proton-donating or proton-receiving groups, Q is an organic moiety, and m and n are the multiplicity of the acidic or basic group, thereby forming coacervated high molecular weight polymer solids, and
   (c) separating the high molecular weight solids from the solution.

2. The process of claim 1 wherein the ratio of polar polymer to solvent is adjusted such that the polymer is completely dissolved, but the solution is near the saturation point.

3. The process of claim 1 wherein the high molecular weight solids separated in step (c) are dissolved, the coacervating substance is precipitated and separated from the polymer in solution.

* * * * *

UNITED STATES PATENT AND TRADEMARK OFFICE
CERTIFICATE OF CORRECTION

PATENT NO. : 4,429,113

DATED : January 31, 1984

INVENTOR(S) : Stephen H. Wu and Clarence C. Dannelly

It is certified that error appears in the above-identified patent and that said Letters Patent is hereby corrected as shown below:

Claim 1, column 8, line 9, after "solution of" delete "the" and insert ---a---.

Claim 1, column 8, line 11, delete "substance" and insert ---polymer---.

Claim 1, column 8, line 18, after "coacervating" delete "substance" and insert ---polymer---.

Signed and Sealed this

Eighth Day of May 1984

[SEAL]

Attest:

GERALD J. MOSSINGHOFF

Attesting Officer

Commissioner of Patents and Trademarks